(12) United States Patent
Caldwell et al.

(10) Patent No.: US 11,082,539 B2
(45) Date of Patent: Aug. 3, 2021

(54) SYSTEM AND METHOD FOR PERFORMING INTERPACKET GAP REPAIR FOR LOSSY PROTOCOLS

(71) Applicant: Avago Technologies International Sales PTE. Limited, Singapore (SG)

(72) Inventors: Maurice D. Caldwell, Lakeway, TX (US); Gary S. Huff, Irvine, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 320 days.

(21) Appl. No.: 16/012,980

(22) Filed: Jun. 20, 2018

(65) Prior Publication Data
US 2019/0394309 A1 Dec. 26, 2019

(51) Int. Cl.
*H04L 29/06* (2006.01)
*H04L 1/00* (2006.01)
*H04L 12/935* (2013.01)
*H04L 12/863* (2013.01)
*H04L 12/807* (2013.01)

(52) U.S. Cl.
CPC .......... *H04L 69/18* (2013.01); *H04L 1/0071* (2013.01); *H04L 47/27* (2013.01); *H04L 47/6245* (2013.01); *H04L 49/30* (2013.01)

(58) Field of Classification Search
CPC ....... H04L 69/18; H04L 1/0071; H04L 47/27; H04L 49/30; H04L 47/6245
See application file for complete search history.

(56) References Cited

U.S. PATENT DOCUMENTS

| | | | |
|---|---|---|---|
| 4,849,970 A | 7/1989 | McCool | |
| 4,878,219 A | 10/1989 | Kaufman et al. | |
| 6,226,290 B1* | 5/2001 | Salett | H04L 45/00 370/389 |
| 6,768,841 B2* | 7/2004 | He | G02B 6/12007 385/31 |
| 9,544,237 B1* | 1/2017 | Lo | H04L 47/22 |
| 10,038,450 B1* | 7/2018 | Cory | H03L 7/00 |
| 2015/0016466 A1* | 1/2015 | Lin | H04L 47/38 370/412 |
| 2016/0085479 A1* | 3/2016 | Edmiston | G06F 3/0683 711/154 |

* cited by examiner

*Primary Examiner* — Walli Z Butt
*Assistant Examiner* — Thad N Defauw
(74) *Attorney, Agent, or Firm* — Morgan, Lewis & Bockius LLP

(57) ABSTRACT

A communication device, method, and data transmission system are provided. An illustrative method is disclosed to include at least one data port configured to enable data transmission in compliance with a communication protocol. The communication device is further disclosed to include an Interpacket Gap (IPG) repair circuit configured to detect an IPG interval within a data stream that violates an IPG interval requirement defined by the communication protocol and, in response to detecting the IPG interval that violates the IPG interval requirement, perform an IPG repair on the data stream and bring the IPG interval into compliance with the IPG interval requirement.

20 Claims, 8 Drawing Sheets

SYSTEM AND METHOD FOR PERFORMING INTERPACKET GAP REPAIR FOR LOSSY PROTOCOLS

FIELD OF THE DISCLOSURE

The present disclosure is generally directed toward communication systems and methods and, more specifically, toward Physical Coding Sub-Layer (PCS) protocols.

BACKGROUND

Certain communication protocols require or define a minimum number of Interpacket Gaps (IPGs) to be sent by a transmit-side Media Access Control (MAC). As an example, the IEEE Ethernet requires a minimum IPG of 12 bytes to be sent by the transmit MAC. As the traffic traverses the Reconciliation Sub-Layer (RS layer) and the Physical Coding Sub-Layer (PCS layer), the 12 bytes of IPG may be reduced down to a minimum, at the point where the traffic is sent along to the Media Dependent Interface (MDI). This minimum degradation threshold of IPG loss is required to facilitate end-to-end interoperability as the traffic traverses to the far end network remote device. As a more specific example, for MII (10M/100M) and GMII (1G) Ethernet, the minimum IPG at the transmit MDI should be approximately 11 bytes. As another example, the XGMII, the minimum IPG at the transmit MDI should be approximately 9 bytes.

BRIEF DESCRIPTION OF THE DRAWINGS

The present disclosure is described in conjunction with the appended figures, which are not necessarily drawn to scale.

DETAILED DESCRIPTION

Figure 1:
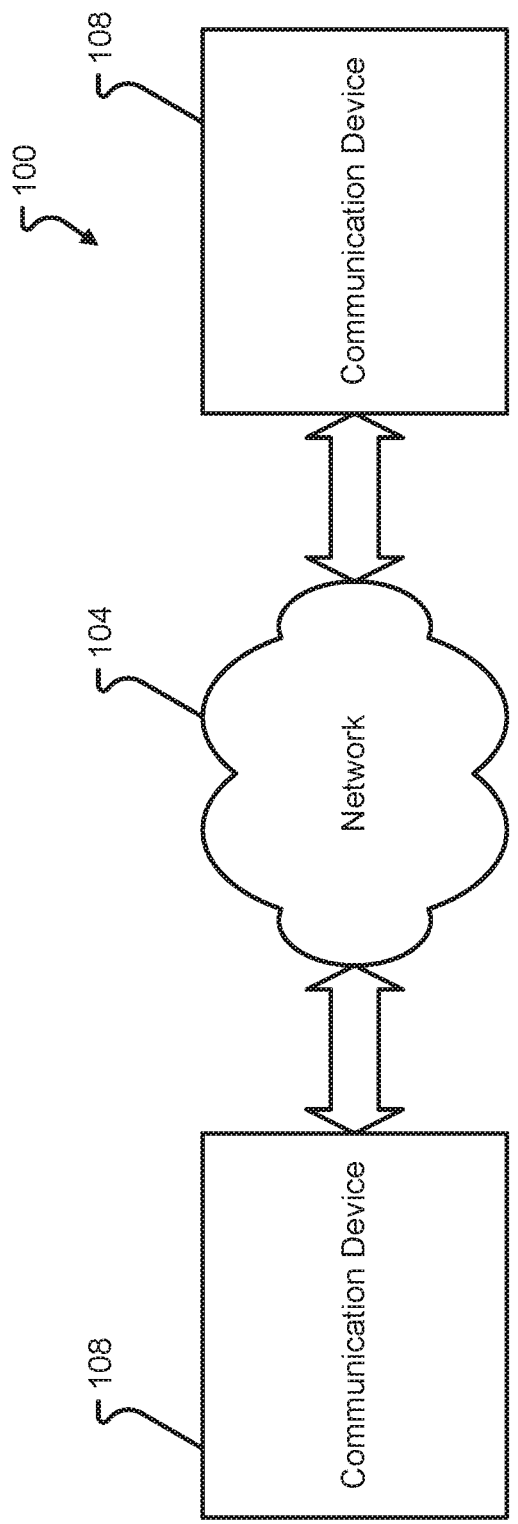
FIG. 1 is a block diagram depicting a data transmission system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any location within a distributed network of components without impacting the operation of the system.

Furthermore, it should be appreciated that the various links connecting the elements can be wired, traces, or wireless links, or any combination thereof, or any other known or later developed element(s) that is capable of supplying and/or communicating data to and from the connected elements. Transmission media used as links, for example, can be any suitable carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any type of methodology, process, mathematical operation or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-8, various systems and methods for enabling data transmission and protocol compliance will be described. While particular embodiments will be described in connection with facilitating communications using a particular communication protocol (e.g., Ethernet), it should be appreciated that embodiments of the present disclosure are not so limited. For example, the methods and systems described herein may be utilized in connection with any type of communication protocol that defines a minimum IPG or similar packet type.

The problem of IPG reduction is often introduced because certain protocols require that Alignment Markers (AMs) are to be periodically inserted into the traffic at fixed spaces or intervals. The AMs help to maintain a synchronization between the transmit side and receive side of the system. To maintain a constant traffic flow rate, the PCS sometimes requires that an IPG be removed/deleted in proportion to the amount of AMs that are inserted. This IPG removal/deletion can cause a catastrophic event if care is not taken to repair the IPG back to the minimum threshold amount.

One aspect of the present disclosure is to provide an IPG repair function or circuit on the receive side of a data transmission system. In some embodiments, the IPG repair function operates on the incoming traffic and ensures that the IPG intervals that violate a defined minimum threshold amount are (i) detected and then (ii) repaired by adding/inserting the amount of IPG that increases the IPG to at least the minimum threshold amount. In some embodiments, the IPG repair function inserts precisely the amount of IPG needed to increase the IPG back to the minimum threshold amount.

In some embodiments, the IPG repair function detects, for every interval in the traffic, whether the IPG is less than a defined minimum threshold amount. Upon detecting an IPG interval that is less than the defined minimum threshold amount (e.g., less than 9 bytes), the IPG repair function adds or inserts at least one IDLE column (e.g., four idle characters) directly after the detected IPG interval. This insertion of at least one IDLE column repairs the IPG interval to greater than or equal to the defined minimum threshold (e.g., back to at least 9 bytes).

One aspect of the present disclosure enables the IPG repair function to perform the repair using a minimal, in-band FIFO buffer. Use of an in-band buffer enables the IPG repair function to repair the IPG interval violation immediately upon detecting the violated IPG interval. Some advantages that can be realized by using the in-band FIFO buffer include a minimized latency and a reduced FIFO size. Additionally, the FIFO pointer separation distances may be resolved by employing an IPG window function that evaluates the read/write pointers to determine (and to what extent) additional IDLE columns are needed to be added. In some embodiments, the IPG repair function may utilize a programmable IPG minimum threshold limit to allow the flexibility to support various different types of PCS protocols (whether standard or proprietary).

With reference now to FIG. 1, additional details of a first data transmission system 100 will be described in accordance with at least some embodiments of the present disclosure. The data transmission system 100 is shown to include two communication devices 108, each of which are connected with a communication network 104. The communication devices 108 may be considered to be communicatively coupled with one another via the communication network 104. Although the communication devices 108 may be provided as any type of machine or collection of components, some non-limiting examples of a communication device 108 include a mobile phone, a smart phone, a Personal Computer (PC), a laptop, a telephone, a tablet, a server, a switch, or data storage device, etc. It should be appreciated that one or both communication devices 108 may be user devices (e.g., devices that are carried and utilized by a user) having a user interface. Alternatively, one or both communication devices 108 may be servers, switches, or other types of machines that are devoid of a robust user interface. Said another way, the communication devices 108 may correspond to any type of machine capable of communicating with another machine via the communication network 104.

The communication network 104 may correspond to any type of communication bus, collection of communication devices, combinations thereof, or the like. As an example, the communication network 104 may correspond to a packet-based communication network. Even more specifically, the communication network 104 may correspond to an IP-based communication network and may use communication protocols such as the Ethernet protocol. It should be appreciated that the communication network 104 does not necessarily need to be limited to an Ethernet-based communication network, but rather any interconnected collection of computing devices using any type of communication protocol or combination of communication protocols may qualify as the communication network 104. The communication network 104 may utilize wired and/or wireless communication protocols.

Figure 2:
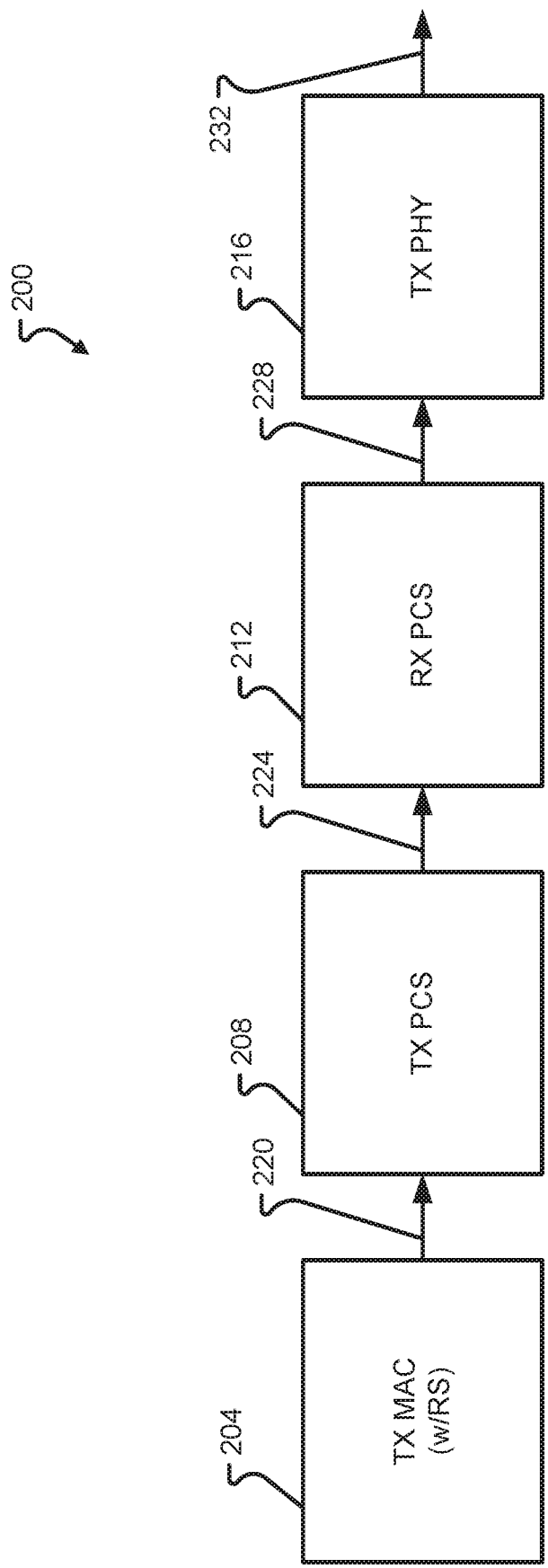
FIG. 2 is a block diagram depicting additional details of a data transmission system in accordance with at least some embodiments of the present disclosure.

With reference now to FIG. 2, additional details of a data transmission system 200 will be described in accordance with at least some embodiments of the present disclosure. The data transmission system 200 may be provided as part of a communication device 108, as part of a component of a communication device 108, or as part of a component within the communication network 104. As a non-limiting example, the system 200 may be provided as part of a networking adaptor within a communication device 108 (e.g., a component of the communication device 108 that enables communications via the network 104). As such, the system 200 may be provided on a network card or board within a host device. In some embodiments, the system 200 is configured to facilitate the transfer of data from one communication device 108 to another communication device 108.

The system 200 is shown to include a transmitter MAC (TX MAC) 204, a transmitter PCS (TX PCS) 208, a receiver PCS (RX PCS) 212, and a transmitter PHY (TX PHY) 216. The TX MAC 204 is shown to include an RS layer. A first data path 220 is shown to connect the TX MAC 204 with the TX PCS 208. The first data path 220 may carry data traffic of a first type. As a non-limiting example, the first data path 220 may carry XGMII traffic from the TX MAC 204 to the TX PCS 208. The XGMII traffic flowing on the first data path 220 may have any number of IPG intervals of various sizes ranging from a first threshold value to a second threshold value. As a non-limiting example, the XGMII traffic, if compliant with IEEE 802.3 standards (e.g., transmit MAC provides a minimum of 12 bytes of IPG) may carry anywhere between 9 bytes and 15 bytes of IPG per IPG interval, as a result of the Deficit Idle Counter (DIC).

The TX PCS 208 may process the data traffic received from the TX MAC 204 and perform an AM insertion process on the received data traffic. As part of performing this AM insertion process, the TX PCS 208 may remove one or more IPG columns from an IPG interval. The TX PCS 208 may be required to insert the AM intervals to facilitate port delineation at the receive-side of the communication network 104. Unfortunately, this process of inserting AMs into the traffic may result in the removal of one or more IPG columns from the traffic. As a non-limiting example, the TX PCS 208 may remove one or more IPG columns from the traffic, which ultimately causes the data stream to violate a minimum threshold amount of IPG for an IPG interval. More specifically, the minimum threshold amount of IPG for any IPG interval may be 9 or more bytes. If an IPG interval in the data traffic received at the first data path 220 only has 9 bytes of IPG to begin with, the TX PCS 208 could conceivably remove four bytes of IPG (e.g., an entire IPG column) leaving the data stream with only 5 bytes of IPG. This may correspond to a violation of a minimum threshold amount of IPG bytes allowed for an IPG interval. Thus, the system interface 224 between the TX PCS 208 and RX PCS 212 may carry data traffic in violation of the minimum threshold amount of IPG per IPG interval. Embodiments of the present disclosure provide an IPG repair function at the receive side of the transmission system to correct this violation.

In particular, an IPG repair function may be provided to correct data traffic between the RX PCS 212 and the TX PHY 216 and/or before the data traffic is put onto the MDI 232. The IPG repair function provided in accordance with at least some embodiments of the present disclosure enables the RX PCS 212 to insert/add one or more IPG columns to accommodate for the previous IPG column removal that was made in connection with AM insertion. Without an IPG repair function, following AM removal, the size of any given IPG interval may possibly fall below the predefined minimum threshold size.

Figure 3:
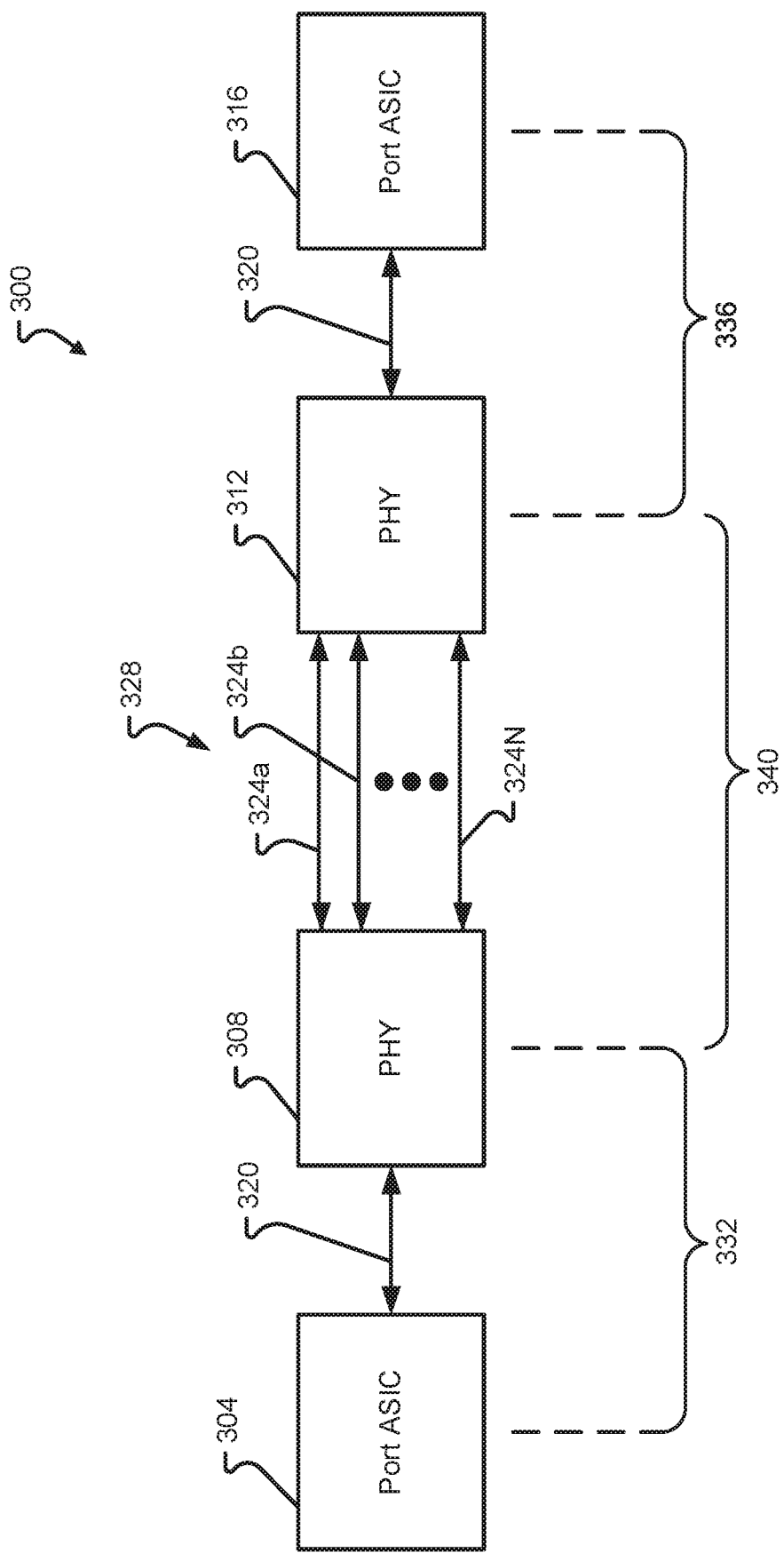
FIG. 3 is a block diagram depicting additional details of a data transmission system in accordance with at least some embodiments of the present disclosure.

With reference now to FIG. 3, additional details of a data transmission system 300 will be described in accordance with at least some embodiments of the present disclosure. The system 300 may be similar to system 100 and/or 200. The view of system 300 specifically shows a first port ASIC 304 and second port ASIC 316 in communication with one another via their respective PHYs 308, 312 and a network interface 328. The network interface 328 may be similar or identical to the MDI 232 shown in FIG. 2. Likewise, the PHYs 308, 312 may be similar or identical to the TX PHY 216 shown in FIG. 2. Further still, the ASICs 304, 316 may correspond to MACs, such as MAC 204, without departing from the scope of the present disclosure.

FIG. 3 helps to illustrate the various clock domains of a data transmission system 300 and depict further details of the network interface 328. In particular, a first system interface 320 is shown between the port ASIC 304 and TX PHY 308. The first system interface 320 may correspond to a USXGMII-M system interface. The network interface 328, as mentioned above, may correspond to an example of an MDI. In some embodiments, the network interface 328 may correspond to a copper MDI, although any type of MDI or media interface can be used without departing from the scope of the present disclosure.

The network interface 328 is shown to include a plurality of signal lines 324a-N. The number N of lines 324 may vary depending upon the communication protocol used within the system 300. Each line 324 may be configured to carry a different signal from a transmission side of the system 300 (e.g., the PHY 308) to the receiving side of the system 300 (e.g., the PHY 312).

The PHY 312 is shown to be connected to the port ASIC 316 by another system interface 320. The system interface 320 on the receive side of the system 300 may be similar or identical to the system interface 320 on the transmit side of the system 300, although such a configuration is not required.

The transmit side is shown to operate using a first clock domain 332, which is separate from the second clock domain 336 in which the receive side operates. The clock domains 332, 336 are separated by the network interface clock domain 340. In some embodiments, each clock domain may be nearly synchronized with one another, but may be driven by different processors or timing crystals, which may have slightly different timing characteristics from processors or timing crystals in the other clock domains. Because of the differences in clock domains 332, 336, a clock-data recovery (CDR) circuit may be provided on the receiver side of the transmission system. In systems which place data from multiple ports onto a single wire, AMs may be used to facilitate port delineation for the receiver. As a non-limiting example, four AMs (e.g., AM0, AM1, AM2, AM3) may be inserted contiguously as a group at a fixed spacing interval. In a simple case, the very first 66-bit encoded/scrambled block following AM3 is assigned to Port0, followed sequentially in ascending order with the remaining blocks of the other ports; then the order is repeated.

Figure 4:
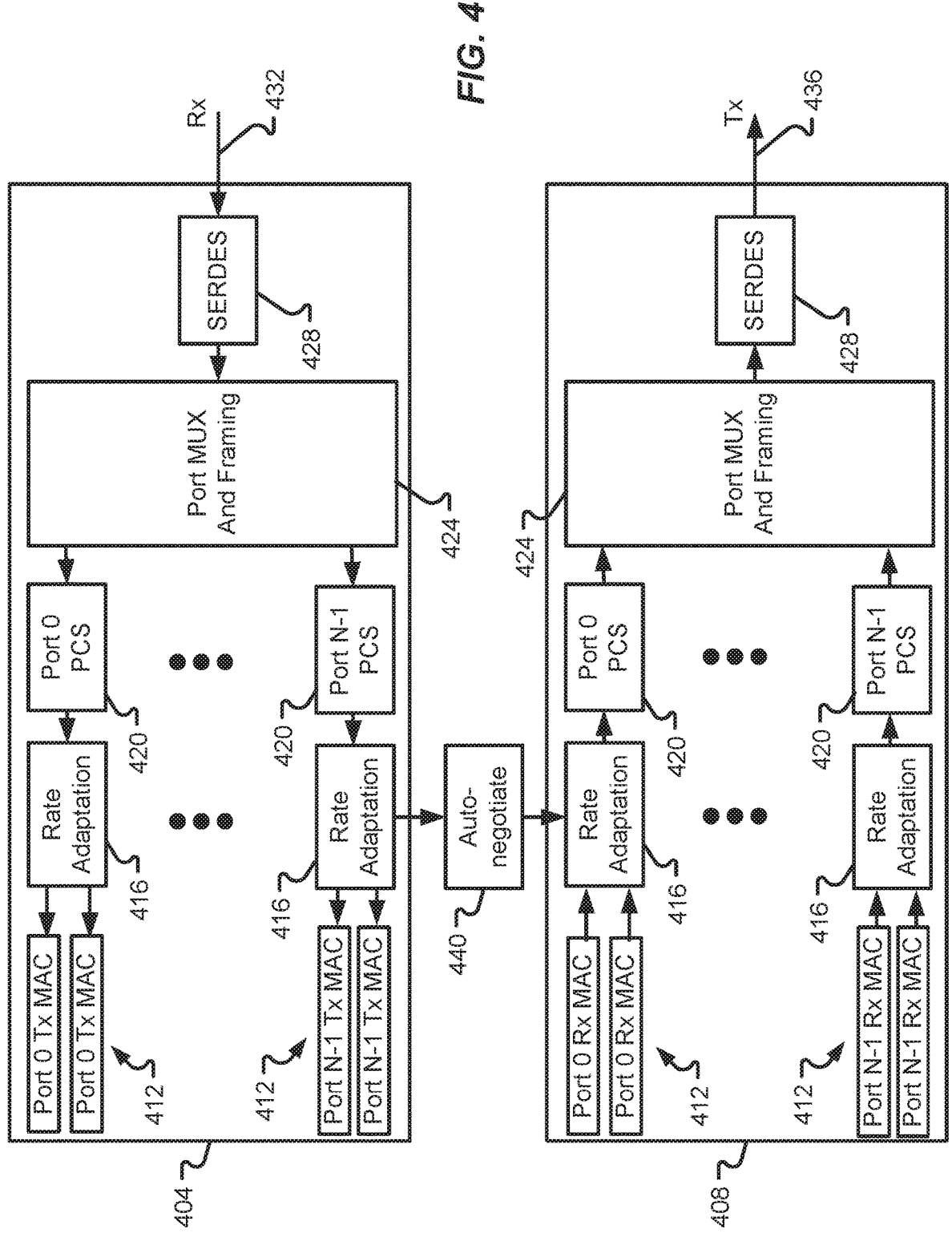
FIG. 4 is a block diagram depicting additional details of a data transmission system in accordance with at least some embodiments of the present disclosure.

With reference now to FIG. 4, additional details of a data transmission system will be described in accordance with at least some embodiments of the present disclosure. The components depicted in the system may correspond to specific components included in a PHY. For instance, a transmit side set of components 404 and a receive side set of components 408 may each comprise a number of components that facilitate the transmit-processing and receive-processing of data streams in accordance with at least some embodiments of the present disclosure. The sets of components 404, 408 may be provided as part of a PHY 216, 308, 312, as part of an ASIC 304, 316, and/or as part of a MAC 204 without departing from the scope of the present disclosure.

The transmit side set of components 404 is shown to include a number of transmit port MACs 412. Pairs of transmit port MACs 412 may be connected with a rate adaption circuit 416, which is configured to remove replication of data packets and perform other known rate-adaptation processes. For instance, data may be replicated to put one port to a slower rate (so that all rates of all ports match for the port MUX and framing circuit 424). In some embodiments, a first of the transmit port MACs 412 may communicate with the rate adaptation circuit 416 using a first protocol (e.g., XGMII) whereas the second of the transmit port MACs 412 may communicate with the rate adaptation circuit 416 using a second protocol (e.g., GMII (10M/100M/1G)). The rate adaptation circuit 416 enables a single port 420 to share information with a transmit port MAC 412 using one of several different types of protocols and helps to match the transmit rates of the various ports. The transmit side set of components 404 is also shown to include a plurality of port PCSs 420 (e.g., one port PCS for each of the ports 0 thru N−1). The plurality of port PCSs 420 are connected to a common port multiplexer (MUX) and framing circuit 424. The port MUX and framing circuit 424 may be configured to distribute different data packets among the different transmit port PCSs 420.

The port MUX and framing circuit 424 may be configured to receive a data stream from a Serializer/Deserializer (SERDES) circuit 428, which is connected to a receive input 432. Thus, any data stream received at the input 432 may first be processed by the SERDES 428, then provided to the port MUX and framing circuit 424. Thereafter, the port MUX and framing circuit 424 distributes the data traffic among the various port PCSs 420.

The receive side set of components 408 may be configured to communicate with the transmit side set of components 404 via an auto-negotiate circuit or set of circuits 440. The auto-negotiate circuit or set of circuits 440 may be configured to facilitate synchronization between the rate adaption circuits 416 on the transmit side 404 and rate adaptation circuits 416 on the receive side 408. The various components on the receive side 408 may be similar to those on the transmit side 404; however, the connection of components may be reversed with respect to the transmit side 404. In particular, the receive port MACs 412 may be provide a data stream to the ports PC Ss 420 via the rate adaptation circuits 416. Again, each rate adaptation circuit 416 may have a pair of receive port MACs 412 connected thereto. A first receive port MAC 412 may communicate with the rate adaptation circuit 416 using XGMII whereas the second receive port MAC 412 may communicate with the rate adaptation circuit 416 using GMII (e.g., 10M/100M/1G). In other words, the port MACs 412 connected to a particular rate adaptation circuit 416 may utilize different protocols for communicating with the rate adaptation circuit 416 without departing from the scope of the present disclosure. The various port PCSs 420 may be connected to a common port MUX and framing circuit 424 that combines the various inputs onto the SERDES 428 for the output line 436.

Figure 5:
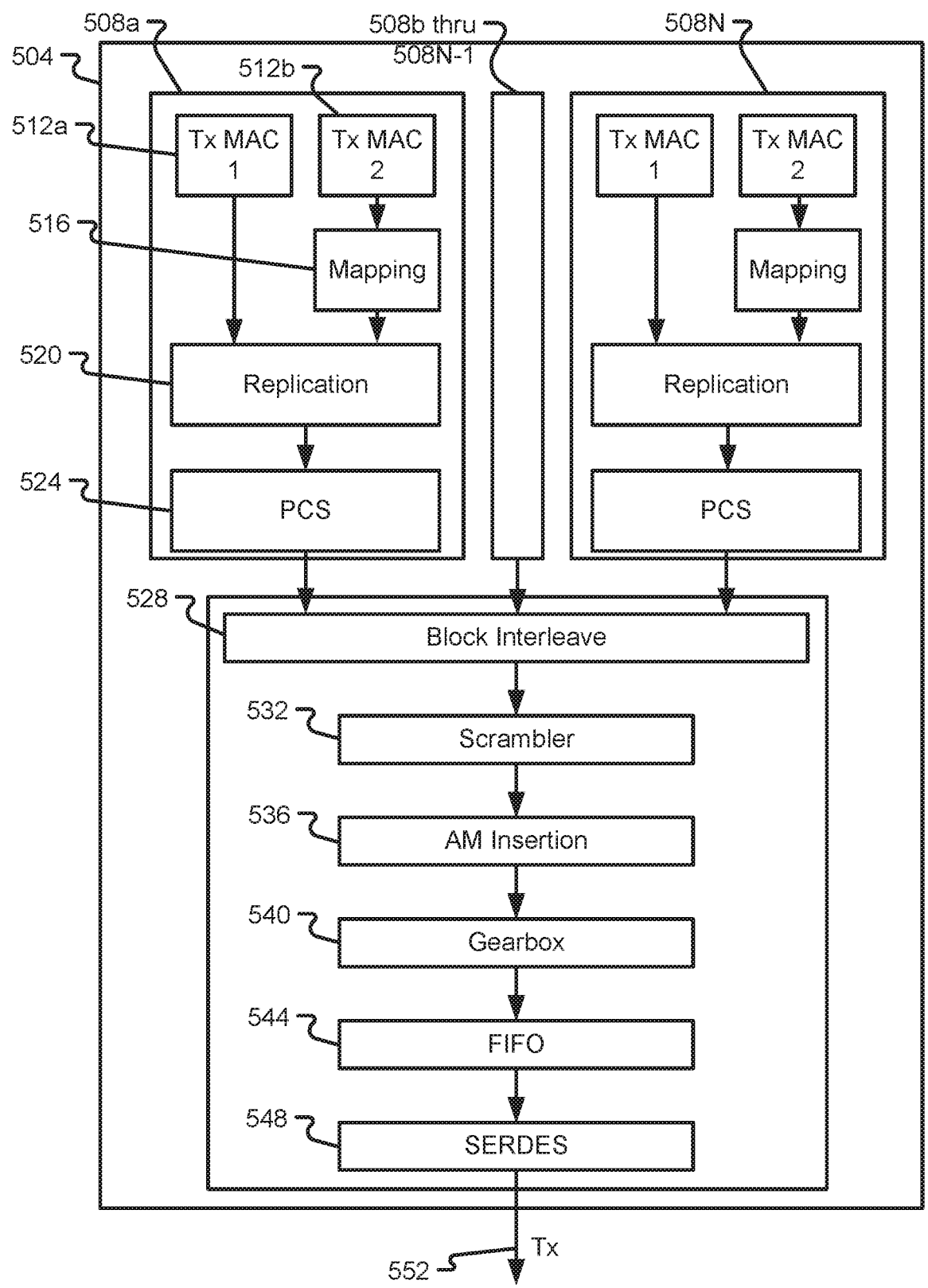
FIG. 5 is a block diagram depicting details of a port ASIC in accordance with at least some embodiments of the present disclosure.

With reference now to FIG. 5, additional details of a port ASIC 504 will be described in accordance with at least some embodiments of the present disclosure. The port ASIC 504 may correspond to a transmission port ASIC 504 and may be similar or identical to a port ASIC 304, 316 and/or a TX MAC 204 without departing from the scope of the present disclosure.

The transmission port ASIC 504 may include a number of components that facilitate the transmission of data streams in accordance with at least some embodiments of the present disclosure. In particular, the transmission port ASIC 504 may include a plurality of ports 508*a*-N along with a plurality of additional circuits configured to process information from the various ports 508*a*-N. Each of the ports 508*a*-N may be provided with a first transmission (Tx) MAC 512*a* and a second Tx MAC 512*b*. The first Tx MAC 512*a* may be directly connected with a replication circuit 520 whereas the second Tx MAC 512*b* may be connected with the replication circuit 520 via a mapping circuit 516. The mapping circuit 516 may be configured to map inputs from the second Tx MAC 512*b* into a format consistent with the first Tx MAC 512*a*. As a more specific but non-limiting example, the first Tx MAC 512*a* may utilize XGMII protocols to communicate with the replication circuit 520 whereas the second Tx MAC 512*b* may utilize 10M/100M/1G communication protocols or some other communication protocol different from the first Tx MAC 512*a*.

The mapping circuit 516 enables the mapping of the second protocol to the first protocol. More specifically, the mapping circuit 516 may be configured to perform a protocol mapping that enables the replication circuit 520 to receive data streams from both Tx MACs 512*a*, 512*b* in a common format (e.g., either the first protocol format or the second protocol format). As a more specific example, the mapping circuit 516 may be configured to perform reference clock conversions, frequency conversions, packet insertion, packet removal, or combinations thereof to map the first protocol to the second protocol within each port 508*a*-N.

The replication circuit 520 may be configured to perform data replication on the data streams received from one or both Tx MACs 512*a*, 512*b* to ensure that data rates of any particular port match the data rates of other ports 508. In particular, the replication circuit 520 may reproduce data packets, blocks, bits, or other representations of data from the Tx MACs 512*a*, 512*b* a predetermined number of times to slow down the data transmission rate as appropriate. According to some embodiments, the replication circuit 520 may reproduce the data anywhere from 10 to 1000 times, depending upon the communication protocol(s) employed.

The replication circuit 520 provides its output to the PCS layer 524 at each port 508*a*-N. The PCS layer 524 may encode the data within each port 508*a*-N and then send data to the block interleave circuit 528 in batches of a predetermined size (e.g., 64 bits to 66 bits), depending upon the protocol used. Each PCS layer 524 of each port 508*a*-N provides its output to the block interleave circuit 528. In some embodiments, the block interleave circuit 528 interleaves the data received from each of the ports 508*a*-N in a round-robin fashion, starting with the first port 508*a*, then the second port 508*b*, until it reaches the last port 508N. After data has been interleaved from the last port 508N, the block interleave circuit 528 returns back to the first port 508*a* to receive the next batch of data therefrom. The block interleave circuit 528 enables data from multiple ports (e.g., 2, 4, 6, 8, . . . , etc.) to be transmitted via a single line/wire. Such an architecture helps to minimize the size of an IC chip used to enable such data transmission and/or reduce overall hardware costs associated with producing such an IC chip.

Data from each of the ports 508*a*-N is interleaved by the block interleave circuit 528 and then provided to a scrambler circuit 532, which perform a scrambling operation on all of the received data. The scrambler circuit 532 is used to scramble the data and make all of the data from each of the ports 508*a*-N appear as if it is originating from a single MAC.

Following the scrambling operation, the scrambled data is provided to an AM insertion circuit 536. The AM insertion process is performed to enable port delineation at the receiving side of the data transmission system. In some embodiments, the AM insertion circuit 536 manipulates the data stream received from the scrambler circuit 532 by inserting one or more AM intervals. AM insertion may occur once every predetermined number of blocks. For instance, AM insertion may occur once every 16400 blocks. In a situation where the ASIC 504 includes four ports 508*a*, 508*b*, 508*c*, 508*d* (e.g., where N=3), the AM insertion circuit 536 will insert four (4) AMs, with a spacing of 16400 blocks between each AM.

The process of inserting one or more AMs into the data stream may result in a removal of one or more IPG columns from an IPG interval. The output of the AM insertion circuit 536 is provided to a gearbox circuit 540, which is configured to appropriately convert the data for eventual transmission over the transmission line 552 in accordance with the data rates defined for the transmission line 552. For instance, the gearbox 540 may convert a data stream or collection of data streams having a particular clock frequency and parallel interface of a particular bit-width into a different number of data streams having a different clock frequency and a different bit-width. The transmission frequency used for the transmission line 552 (e.g., the MDI 232) may vary depending upon the protocol used.

The output of the gearbox 540 is provided to a transmission buffer 544, which appropriately buffers the received data until the data is ready for processing by the SERDES 548. The transmission buffer 544 may correspond to any type of known data buffer and may utilize any type of buffer memory. In some embodiments, the transmission buffer 544 corresponds to a FIFO buffer and operates on a first-in-first-out basis. Of course other types of buffers may be used and any type of buffer memory device can be used for the transmission buffer 544.

The SERDES 548 is configured to perform final data serialization processes on the data stream received from the transmission buffer 544. The SERDES 548 may include one or more circuits such as shift register circuits, equalization circuits, amplifier circuits, digital-to-analog converter circuits, analog-to-digital converter circuits, filter circuits, and/or data latches. The output of the SERDES 548 is provided to the transmission line 552 for transmission across a communication network 104.

Figure 6:
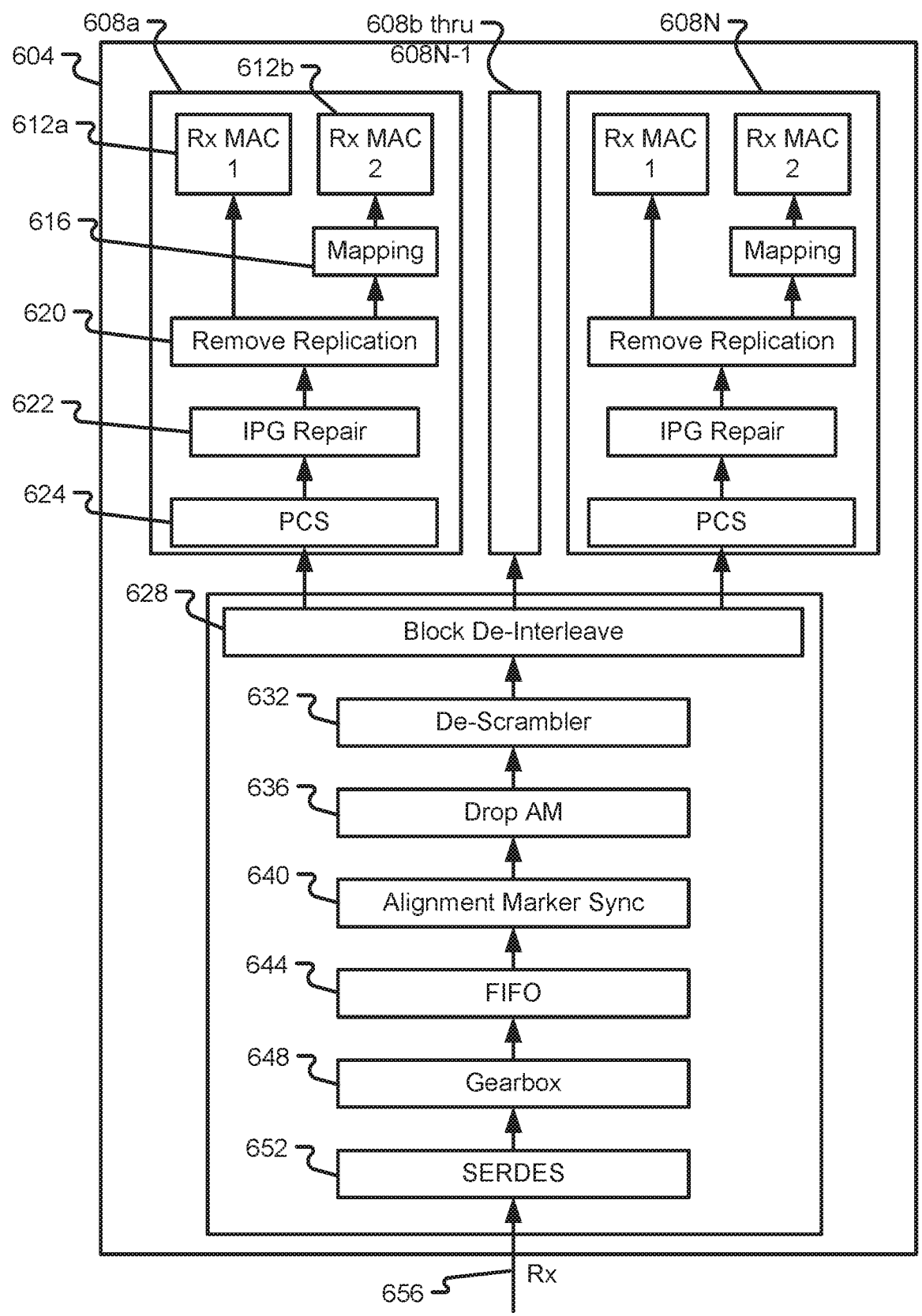
FIG. 6 is a block diagram depicting a transmit side of a system interface in accordance with at least some embodiments of the present disclosure.

With reference now to FIG. 6, additional details of a port ASIC 604 will be described in accordance with at least some embodiments of the present disclosure. The port ASIC 604 may correspond to a receive port ASIC 604 and may be similar or identical to a port ASIC 304, 316.

The receive port ASIC 604 may include a number of components that facilitate receiving and processing of data streams in accordance with at least some embodiments of the present disclosure. In particular, the receive port ASIC 604, much like the transmit port ASIC 504, may include a plurality of ports 608a-N along with a plurality of additional circuits configured to process information for the various ports 608a-N. Each of the ports 608a-N may be provided with a first receiver (Rx) MAC 612a and a second Rx MAC 612b. The first Rx MAC 612a may be directly connected with a de-replication circuit 620 whereas the second Rx MAC 612b may be connected with the de-replication circuit 620 via a mapping circuit 616.

Each port 608a-N is also shown to include an IPG repair circuit 622. The IPG repair circuit 622 may be configured to perform an IPG repair function to help correct any violations of IPG interval size introduced to the data stream by the AM insertion process. In some embodiments, the IPG repair circuit 622 is configured to insert one or more IPG columns upon detecting that an IPG interval has violated a minimum threshold amount of IPG columns (e.g., the removal of IPG to accommodate the AM insertion process resulted in a removal of too many IPG columns in violation of the protocol requirements). The IPG repair circuit 622 inserts an appropriate number of IPG columns to bring the data stream back into compliance with the communication protocol being employed prior to providing the data stream to the MACs 612a, 612b. Additional details of the functionality of the IPG repair circuit 622 will be described in connection with FIGS. 7A-7C and 8. Although FIG. 6 depicts the IPG repair circuit 622 as being positioned between the PCS layer 624 and de-replication circuit 620, it should be appreciated that the IPG repair circuit 622 can alternatively be positioned above/behind the de-replication circuit 620. In other words, the IPG repair circuit 622 may be positioned between the de-replication circuit 620 and the mapping circuit 616/Rx MACs 612a, 612b.

Certain components of the ports 608a-N may be similar to similarly-named components of the ports 508a-N, except that the components of ports 608a-N are connected in reverse to perform a reverse processing of the ports 508a-N. For instance, the mapping circuit 616 maps the communication protocol back to the second protocol whereas the mapping circuit 516 was used to map the communication protocol from the second protocol to the first protocol (consistent with the protocol used by the other MAC). As a more specific but non-limiting example, the first Rx MAC 612a may utilize XGMII protocols to communicate with the de-replication circuit 620 whereas the second Rx MAC 612b may utilize 10M/100M/1G communication protocols or some other communication protocol different from the first Rx MAC 612a. As such, the mapping circuit 616 may map the protocol back to 10M/100M/1G from the XGMII protocol. The de-replication circuit 620 may undo the replication of data provided by the replication circuit 520. Similarly, the PCS layer 624 may decode the encoding that was performed by the PCS layer 524.

As mentioned above, the primary difference between the ports on the transmit side and the ports on the receive side is that the ports on the receive side include an IPG repair circuit 622 to help correct any situation where an IPG interval has too few IPG columns (e.g., violates a minimum IPG size threshold). In some embodiments, functionality of the IPG repair circuit 622 may be incorporated into the PCS 624 and/or data de-replication circuit 620. As a non-limiting example, some combination of the de-replication circuit 620, the IPG repair circuit 622, and the PCS 624 may be configured to receive and temporarily store data from the block de-interleave circuit 628. Upon receiving a block of data, the counter may be utilized to begin counting down and enabling the IPG repair circuit 622 to search for IPG size violations. If a violation of the minimum IPG interval size is detected, then the IPG repair circuit 622 may correct the IPG interval by adding one or more IPG columns back to the IPG interval.

Independent of any IPG repair correction events over a specified number of blocks, the IPG repair circuit may ensure that the write/read pointer relationship (i.e. pointer separation) of the FIFO, within, maintains a healthy separation to prevent data corruption. This is achieved by employing an IPG repair window counter that serves to demarcate between the IPG repair of violated IPG intervals and that of the FIFO write/read pointer relationship. The IPG window counter is configured to a predefined initial value and decrements by one upon receiving a block of decoded traffic (e.g. XGMII word). While the IPG repair window counter is non-zero, the IPG repair circuits is continuously detecting and correcting any IPG intervals in violation of the minimum IPG threshold. Once the IPG repair window counter expires (i.e. counts down to a value of zero), then the IPG repair circuit advances to the write/read pointer repair mode. While in this mode, it will add as many IDLE columns as necessary to adjust the write/read pointer relationship to a predefined pointer separation value. Once this is achieved, then the IPG repair counter is configured back to the predefined initial value, thereby, causing the IPG repair circuit to repeat the actual repair mode; i.e. continuously detecting and correcting any IPG intervals in violation of the minimum IPG threshold. (NOTE: The removal of the AMs causes a write/read FIFO clock frequency difference, which causes the FIFO's pointers to drift apart from their initial reset separation value. In addition, the IPG repairing of IPG intervals in violation of the minimum threshold value will also cause the FIFO's pointer relationship to adjust.) For any given IPG repair window duration, there are three possible scenarios of the two modes of the IPG repair circuit: 1) IPG repair circuit performs enough IPG repair corrections on N-number of violated IPG intervals, such that the write/read FIFO pointer relationship are in an ideal state; 2) the traffic is such that there are no IPG intervals violating the minimum threshold amount (i.e. no IPG corrections), thereby causing the write/read pointer repair mode to fix the pointer relationship; and, 3) IPG repair circuit performs enough IPG repair corrections on N-number of violated IPG intervals, however, the write/read pointer repair mode is still required to fix the remaining pointer relationship delta.

Prior to each port 608a-N receiving data, however, the data stream received at the receive line 656 should be processed to reverse the operations performed by the other components of the transmission port ASIC 504. In particular, the receive port ASIC 604 is shown to include a SERDES 652, a gearbox 648, a receive buffer 644, a synchronization circuit 640, a drop AM circuit 636, a descrambler circuit 632, and the block de-interleave circuit 628. The data received at the receive line 656 is deserialized (e.g., parallelized) by the SERDES 652 and then provided to the gearbox 648, which adjusts the so-called "gear ratio" of the data from the receive line 656 to an appropriate speed and number of channels for processing by the other components of the ASIC 604. As a non-limiting example, the gearbox 648 may convert the data back from a 32 bit data stream to a 66 bit data stream (whereas the gearbox 544 converted the data from a 66 bit data stream to a 32 bit data stream).

The output of the gearbox 648 is provided to the receive buffer 644, which may be in the form of a FIFO buffer 644. In some embodiments, the receive buffer 644 is an asynchronous FIFO buffer that serves as the clock boundary between the network and the receive port ASIC 604, which is configured to operate using the PCS 624 clock domain rather than the network clock domain.

Data from the receive buffer 644 is provided to the synchronization circuit 640. The FIFO circuit 644 utilizes the non-scrambled sync header of the encoded/scrambled payload of the received block in order to align to the block boundary. For example, the block could be made up of a non-scrambled 2-bit sync header and a scrambled 64-bit payload, resulting is a 66-bit block. In addition, the periodically inserted AMs are in 66-bit format, but the entire 66-bits of each of the four AMs are not scrambled. The synchronization circuit 640 searches for and detects the fixed and periodically inserted AMs and locks to them.

In some embodiments, an AM may include a 2 bit synchronization header having a predetermined format (e.g., a "01" or "10") that helps to ensure the boundaries of encoded data are properly maintained and to facilitate port delineation. The AMs inserted at the transmit side are not encoded at the transmit side and, therefore, provide a quick and effective mechanism for identifying boundaries of data received from different transmit ports 508a-N (for eventual assignment to corresponding receive ports 608a-N). After the synchronization circuit 640 has processed the received data, the drop AM circuit 636 removes those AMs previously inserted by the AM insertion circuit 536, thereby leaving only the encoded data for further processing.

The data stream is then de-scrambled by the de-scrambler circuit 632. In some embodiments, the de-scrambler circuit 632 applies a reverse algorithm to the scrambling algorithm applied by the scrambler circuit 532. The de-scrambled data is then de-interleaved by the block de-interleaver circuit 628. The block de-interleaver circuit 628 distributes the data from a single stream onto the plurality of ports 608a-N. The data distribution among the ports 608a-N may occur in a round-robin fashion (following the interleaving process performed at the transmit side) without departing from the scope of the present disclosure.

Each port 608a-N receives data from the block de-interleaver circuit 628 and utilizes the PCS layer 624 to decode the data prior to placing the decoded data onto the IPG repair circuit 622 and then the de-replication circuit 620. At this point, the data will be provided to the different Rx MACs 612a, 612b depending upon which protocol is currently being used at each port 608a-N. Thus, each port 608a-N can support multiple protocols without departing from the scope of the present disclosure. The data provided to the appropriate Rx MAC 612a, 612b may be similar or identical to the data provided by the corresponding Tx MAC 512a, 512b of a corresponding port 508a-N.

With reference now to FIGS. 7A-C and 8, additional details of the operation of the IPG repair circuit 622 will be described in accordance with at least some embodiments of the present disclosure. In particular, a method 800 of performing an IPG repair function will be described with reference to an illustrative data stream 700 having a plurality of blocks.

The method 800 begins with the IPG repair circuit 622 performing an analysis of incoming blocks on the data stream 700 (step 804). The IPG repair circuit 622 determines if an IPG repair window counter has decremented from a predetermined value down to zero (step 808). If the IPG repair window counter has lapsed (e.g., the query of step 808 is answered affirmatively), then the IPG repair circuit 622 determines if an IPG interval is detected in a block 712 of the data stream 700 (step 812). If not, the method 800 returns to step 804. If so, the method continues with the IPG repair circuit 622 inserting one or more IDLE column(s) to fix a write/read FIFO pointer separation (step 816). The IPG repair circuit 622 then sets an IPG repair window counter back to the initial predefined value (step 820).

Referring back to step 808, if the IPG repair circuit 622 has not completely decremented the IPG repair window counter, the method 800 continues with the IPG repair circuit 622 decrementing the IPG repair window counter by a predetermined value (e.g., one) (step 824). Thereafter, the method 800 continues with the IPG repair circuit 622 determining if an IPG interval has been detected (step 828). Alternatively or additionally (in step 828 and/or step 812), the IPG repair circuit 622 may search for other types of data blocks 712 or columns 716 within the data stream 700 in connection with searching for an IPG interval violation. If no IPG interval or other type of predetermined data block 712 or column 716 is detected, then the method returns to step 804.

Figure 7A:
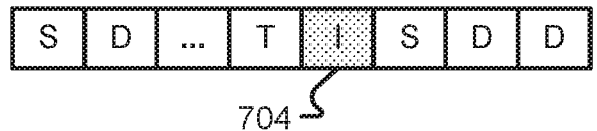
FIGS. 7A-7C are block diagrams depicting a receive side of a system interface in accordance with at least some embodiments of the present disclosure.
Figure 7B:
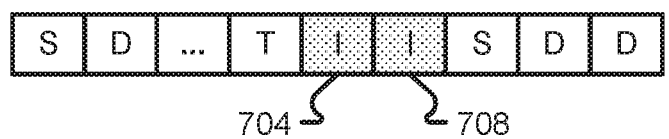
Figure 7C:
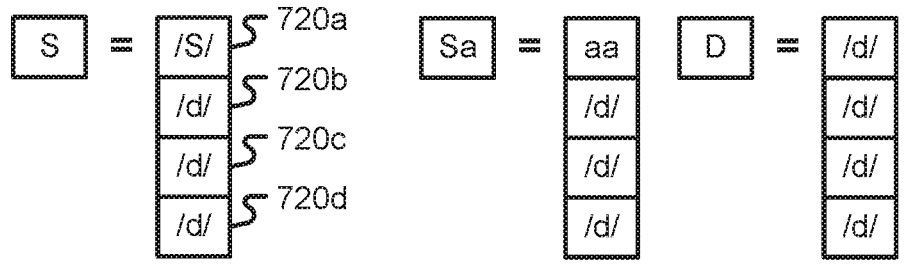
Figure 7C:
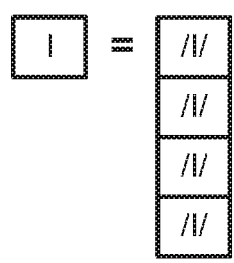
Figure 7C:
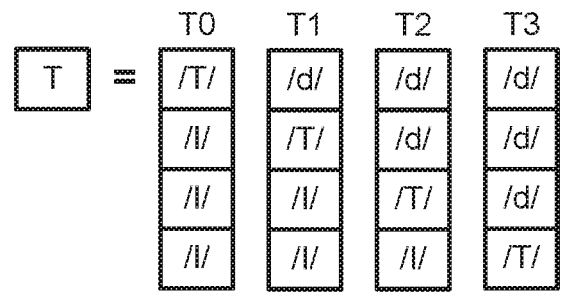
Figure 8:
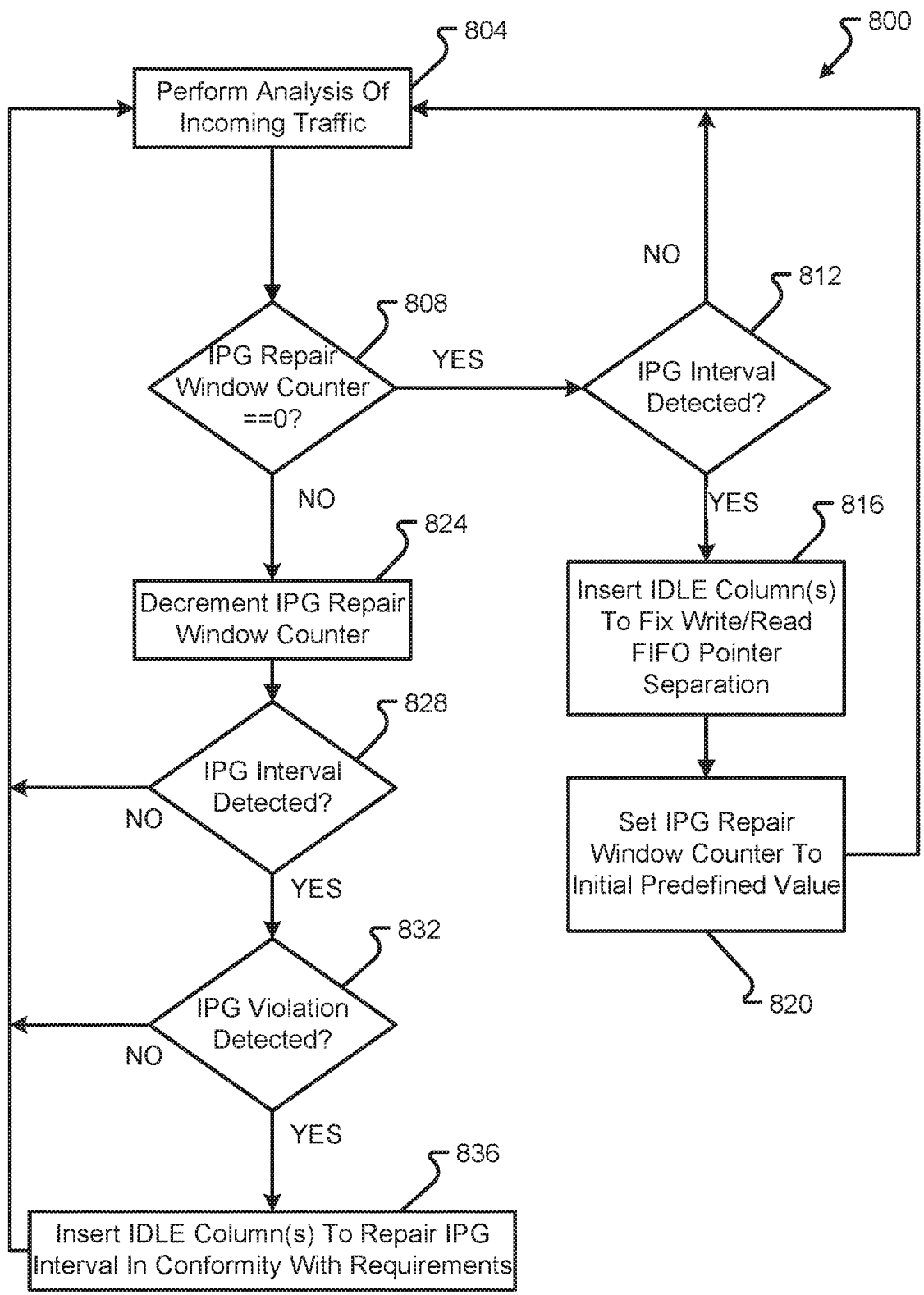
FIG. 8 is a flow diagram depicting a method of performing IPG repair in accordance with at least some embodiments of the present disclosure.

As shown in FIG. 7C, each data block 712 may also be represented as a data column 716. A data column 716 may include a plurality of rows 720a, 720b, 720c, 720c. Each different type of data column 716 may have different rows of data. As a non-limiting example, XGMII traffic may include four octets per data block 712. In other words, four octets may constitute an XGMII interface, which may alternatively be referred to as an XGMII column 716. Continuing the non-limiting example, a starter block "S" includes a starter character "/S/" in the first row 720a followed by three rows of data "/d/" characters. The starter block "Sa" depicts an output of the replication 520 of the starter block "S," and includes an identifier "aa" in the first row 720a followed by three rows of data "/d/" characters. A data column block "D" includes four rows of data "/d/" characters. An idle block "I" includes four idle "/I/" characters. A terminate block "T" may be provided in four different variants. A terminate block "T" is provided to represent an end of a set of data blocks belonging to a common data set (e.g., a data packet). If all data for a data packet can be evenly filled with only data columns, then the first terminate column T0 can be used. The first terminate column T0 provides no additional data for the data packet represented in the previous data blocks. Thus, the first terminate column T0 includes a terminate "/T/" character in the first row 720a followed by three idle "/I/" characters. Thus, the first terminate column T0 inherently provides three idle "/I/" characters before the preceding idle block will provide an additional four idle "/I/" characters.

The second terminate column T1 accommodates one additional data character in the first row 720*a* and then includes the terminate "/T/" character in the second row 720*b* followed by two idle "/I/" Characters. The Third Terminate Column T2 accommodates two additional data characters in the first and second rows 720*a*, 720*b* and then includes the terminate "/T/" character in the third row 720*c* followed by one idle "/I/" character. Lastly, the fourth terminate column T3 accommodates three additional data characters in the first three rows 720*a*, 720*b*, 720*c* followed by a terminate "/T/" character in the fourth row 720*d*. Based on the format of terminate columns, most communication protocols may require that at least two idle blocks follow a terminate block. In other words, an idle block represents an IPG size of 4 bytes (due to the four idle "/I/" characters provided therein). If a communication protocol has a minimum IPG interval size of 9 bytes, for example, then each terminate block "T" should be followed by at least two idle blocks (e.g., two IPG columns, which inherently provide eight bytes of idle "/I/" characters). It should be appreciated that an IPG interval may be larger than the minimum (e.g., if no traffic exists for some time between successive packets), but the minimum IPG interval size is used to define a minimum number of IPG columns (or minimum size of IPG as measured in bytes) is not less than a predetermined minimum value.

Referring back to the method 800, if the IPG repair circuit 622 detects an IPG interval 704 at step 828 (or idle block "I" or terminate block "T"), the IPG repair circuit 622 will continue by determining if an IPG violation has been detected within the IPG interval 704 (step 832). In particular, if the IPG repair circuit 622 detects that less than a predetermined minimum number of idle characters (or IPG columns) are not present in consecutive blocks or a terminate block "T" is not followed by at least two idle blocks "I" to support the predetermined IPG size, then the IPR repair circuit 622 will begin the process of repairing the data stream 700 to bring the stream 700 back into conformity with the IPG interval requirements (step 836). As a non-limiting example, one or more idle blocks/columns 708 may be inserted into the data stream 700 to repair the IPG interval 704 that was detected as violating the IPG interval requirements of the communication protocol. In some embodiments, the terminate block "T" represents the start of the IPG interval. As long as a predetermined number of idle characters are provided within the terminate block "T" and immediately-following idle blocks "I", the IPG interval requirements can be accommodated. However, if AM insertion or some other process resulted in the removal of one of the idle blocks "I", then the IPG repair function 622 is provided with the ability to insert or add back one or more idle blocks "I" to place the data stream 700 back into compliance with the IPG interval requirements.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A communication device, comprising:
   a first port comprising:
      a first MAC configured to operate in accordance with a first communication protocol;
      a second MAC configured to operate in accordance with a second communication protocol; and
      a mapping circuit configured to translate data for the second MAC from the first communication protocol to the second communication protocol;
   a second port comprising:
      a third MAC configured to operate in accordance with the first communication protocol; and
      a fourth MAC configured to operate in accordance with the second communication protocol; and
      an interpacket gap (IPG) repair circuit configured to detect an IPG interval within a data stream that violates an IPG interval requirement defined by the first communication protocol and, in response to detection of the IPG interval that violates the IPG interval requirement, perform an IPG repair on the data stream and bring the IPG interval into compliance with the IPG interval requirement, the data stream being received over at least one of the first or second ports.

2. The communication device of claim 1, wherein the IPG repair circuit detects the IPG interval that violates the IPG interval requirement by scanning the data stream for a terminate block.

3. The communication device of claim 1, wherein the IPG repair circuit is configured to perform the IPG repair on the data stream by adding one or more IPG intervals to the data stream.

4. The communication device of claim 1, wherein an alignment marker (AM) insertion circuit is configured to remove at least one idle block and replace the removed at least one idle block with an AM.

5. The communication device of claim 1, further comprising:
   a block de-interleaver circuit configured to de-interleave data between the first port and the second port.

6. The communication device of claim 2, wherein the IPG repair circuit further detects the IPG interval that violates the IPG interval requirement by counting a number of idle blocks that immediately follow the terminate block.

7. The communication device of claim 4, wherein the removal of the at least one idle block causes the data stream to violate the IPG interval requirement.

8. The communication device of claim 6, wherein the IPG repair circuit further detects the IPG interval that violates the IPG interval requirement by comparing a number of idle characters in the terminate block and the idle blocks that immediately follow the terminate block with a predetermined minimum number of idle characters that are defined by the communication protocol.

9. The communication device of claim 8, wherein the IPG repair circuit performs the IPG repair on the data stream by adding a sufficient number of idle characters following the terminate block to be equal to or greater than the predetermined minimum number of idle characters.

10. The communication device of claim 9, wherein the IPG repair circuit is configured to add at least one idle block immediately before or immediately after the idle block that immediately follows the terminate block.

11. The communication device of claim 10, wherein the at least one idle block includes four idle characters.

12. A method comprising:
operating a first MAC of a first port in accordance with a first communication protocol;
operating a second MAC of the first port in accordance with a second communication protocol; and
operating a third MAC of a second port in accordance with the first communication protocol;
operating a fourth MAC of the second port in accordance with the second communication protocol;
receiving a data stream over at least one of the first or second ports;
analyzing the data stream;
detecting an Interpacket Gap (IPG) interval within the data stream that violates an IPG interval requirement defined by a communication protocol used for communicating data within the data stream; and
in response to detecting the IPG interval that violates the IPG interval requirement, performing an IPG repair process on the data stream to bring the IPG interval into compliance with the IPG interval requirement.

13. The method of claim 12, wherein detecting the IPG interval that violates the IPG interval requirement comprises:
scanning the data stream for a terminate block; and
counting a number of idle blocks that immediately follow the terminate block.

14. The method of claim 12, further comprising:
removing at least one idle block from the data stream; and
replacing the removed at least one idle block with an alignment marker (AM).

15. The method of claim 12, further comprising: de-interleaving data between a first data port and a second data port.

16. The method of claim 13, wherein detecting the IPG interval that violates the IPG interval requirement further comprises:
comparing a number of idle characters in the terminate block and the idle blocks that immediately follow the terminate block with a predetermined minimum number of idle characters that are defined by the communication protocol.

17. The method of claim 16, wherein performing the IPG repair process on the data stream comprises:
adding a number of idle characters following the terminate block to raise the number of idle characters included in the terminate block and the idle blocks to a level that is equal to or greater than the predetermined minimum number of idle characters.

18. The method of claim 17, wherein the number of idle characters are added via insertion of an idle block that includes four idle characters.

19. A data transmission system, comprising:
a first port comprising:
a first MAC configured to operate in accordance with a first communication protocol;
a second MAC configured to operate in accordance with a second communication protocol that is different from the first communication protocol; and
a mapping circuit configured to translate data for the second MAC from the first communication protocol to the second communication protocol;
a second port comprising:
a third MAC configured to operate in accordance with the first communication protocol;
a fourth MAC configured to operate in accordance with the second communication protocol; and
a second mapping circuit configured to translate data for the fourth MAC from the first communication protocol to the second communication protocol;
a block de-interleaver circuit configured to distribute data between the first port and the second port; and
an interpacket gap (IPG) repair circuit configured to analyze a data stream output by the block de-interleaver circuit to determine whether removal of at least one idle block causes the data stream to break compliance with an IPG interval requirement of the first communication protocol and then insert an idle block to bring the data stream back into compliance with the IPG interval requirement.

20. The data transmission system of claim 19, wherein the IPG repair circuit is configured to count a number of idle blocks in the data stream that immediately follow a terminate block and compares a number of idle characters in the terminate block and the idle blocks that immediately follow the terminate block with a predetermined minimum number of idle characters that are defined by the first communication protocol.

* * * * *